United States Patent [19]
Gerakoulis

[11] Patent Number: 5,995,497
[45] Date of Patent: *Nov. 30, 1999

[54] METHOD AND APPARATUS FOR SWITCHING CODE DIVISION MULTIPLE ACCESS MODULATED BEAMS IN A SATELLITE

[75] Inventor: Diakoumis Parissis Gerakoulis, Dover, N.J.

[73] Assignee: AT&T Corp., New York, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/778,894

[22] Filed: Jan. 2, 1997

Related U.S. Application Data

[63] Continuation-in-part of application No. 08/635,162, Apr. 23, 1996, abandoned.

[51] Int. Cl.⁶ .................................................... H04J 13/02
[52] U.S. Cl. ...................... 370/320; 370/208; 455/13.3; 455/428; 455/98; 342/353
[58] Field of Search .................................... 370/320, 310, 370/330, 319, 209, 316, 328, 329, 208, 315; 455/13.3, 20, 428, 12.1, 427, 98; 375/208, 200; 340/825.03; 342/352, 353

[56] References Cited

U.S. PATENT DOCUMENTS

| | | |
|---|---|---|
| 4,491,947 | 1/1985 | Frank . |
| 4,901,307 | 2/1990 | Gilhousen et al. .................... 370/320 |
| 5,239,545 | 8/1993 | Buchholz . |

(List continued on next page.)

OTHER PUBLICATIONS

Bonuccelli, "A Fast Time Slot Assignment Algorithm for TDM Hierarchial Switching Systems", IEEE Transactions on Communications, Vo. 37, No. 8, Aug. 1989.

Stern, "Design Issues Relevant to Developing an Integrated Voice/Data Mobile Radio System", IEEE Transactions on Vehicular Technology, vol. 39, No. 4, Nov. 1990.

Acampora et al., "A Metropolitan Area Radio System Using Scanning Pencil Beams", IEEE Transactions on Communications, Vo. 39, No. 1, Jan. 1991.

Rose, "Rapid Optimal Scheduling for Time–Multiplex Switches Using a Cellular Automaton", IEEE Transactions on Connumications, Vo. 37, No. 5, May 1989.

Inukai, "An Efficient SS/TDMA Time Slot Assignment Algorithm", IEEE Transactions on Communications, vol. COM–27, No. 10, Oct. 1979.

Sriram et al., "Discrete–Time Analysis of Integrated Voice/Data Multiplexers With and Without Speech Activity Detectors", IEEE Journal on Selected Areas in Communications, vol. SAC–1, No. 6, Dec. 1983.

Rose et al., "The Performance of Random and Optimal Scheduling in a Time–Multiplex Switch", IEEE Transactions on Communications, vol. CDM–35, No. 8, Aug. 1987.

*Primary Examiner*—Michael Horabik
*Assistant Examiner*—William H. Wilson, Jr.
*Attorney, Agent, or Firm*—Alfred G. Steinmetz

[57] ABSTRACT

In a code division switch in a satellite communication system each of a plurality of uplink CDMA modulated RF beams, each including a plurality of uplink traffic channels, are down converted to IF and overspread with a new orthogonal code having a spreading rate N times that of the spreading code of the uplink CDMA modulated RF beam. All of the overspread beams are combined into a single combined IF stream. The individual traffic channels are extracted from the combined IF stream by de-overspreading the stream with orthogonal codes and despreading with beam and traffic channel specific orthogonal codes. All traffic channels are respread with downlink beam codes and downlink orthogonal traffic channel codes and joined onto selected ones of downlink CDMA modulated IF beams having common destinations with the included traffic channels. Downlink CDMA modulated IF beams are up converted to RF frequency and transmitted to selected destinations.

8 Claims, 7 Drawing Sheets

U.S. PATENT DOCUMENTS

| | | | |
|---|---|---|---|
| 5,327,455 | 7/1994 | De Gaudenzi et al. | 370/320 X |
| 5,365,590 | 11/1994 | Brame . | |
| 5,506,848 | 4/1996 | Drakopoulos et al. . | |
| 5,594,941 | 1/1997 | Dent | 370/310 X |
| 5,608,722 | 3/1997 | Miller | 370/320 |
| 5,654,955 | 8/1997 | Natali | 370/320 |
| 5,745,839 | 4/1998 | Lieberman | 370/320 X |
| 5,757,767 | 5/1998 | Zehavi | 370/208 |
| 5,765,098 | 6/1998 | Bella | 455/13.3 |
| 5,805,579 | 9/1998 | Erving et al. | 370/320 |
| 5,815,527 | 9/1998 | Erving et al. | 370/320 X |

SATELLITE SWITCHED/CODE DIVISION MULTIPLE ACCESS(SS/CDMA)
CODE SWITCHING SYSTEM ARCHITECTURE

ACRU: ACCESS CHANNEL RECEPTION UNIT
SBTU: SATELLITE BROADCAST TRANSMITTER UNIT
CDM: CODE DIVISION MULTIPLEXER

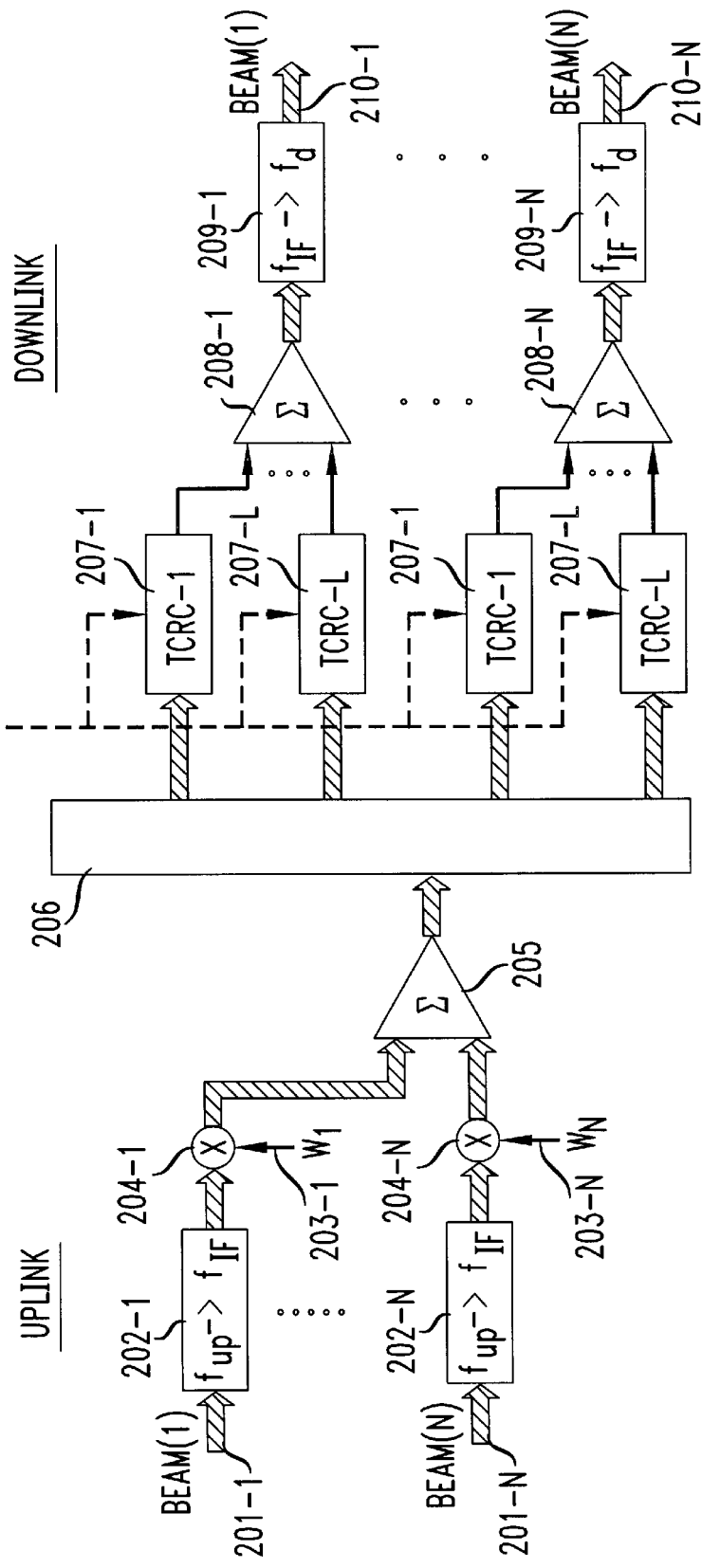
FIG. 2 SATELLITE SWITCHED/CODE DIVISION MULTIPLE ACCESS (SS/CDMA) CODE DIVISION SWITCH (CDS)
OVERSPREADING IS REQUIRED BEFORE COMBINING ALL UPLINK BEAMS
OVERSPREADING SPREADS THE BANDWIDTH N TIMES; e.g., B=10MHz N=8 NxB=80MHz
ALL CHIPS BEFORE OVERSPREADING ARE PERFECTLY SYNCHRONIZED
THERE ARE N OVERSPREAD WALSH CHIPS PER CHIP (BEFORE OVERSPREADING)

FIG. 3

SATELLITE SWITCHED/CODE DIVISION MULTIPLE ACCESS (SS/CMDA) TRAFFIC CHANNEL RECOVERY CIRCUIT (TCRC)

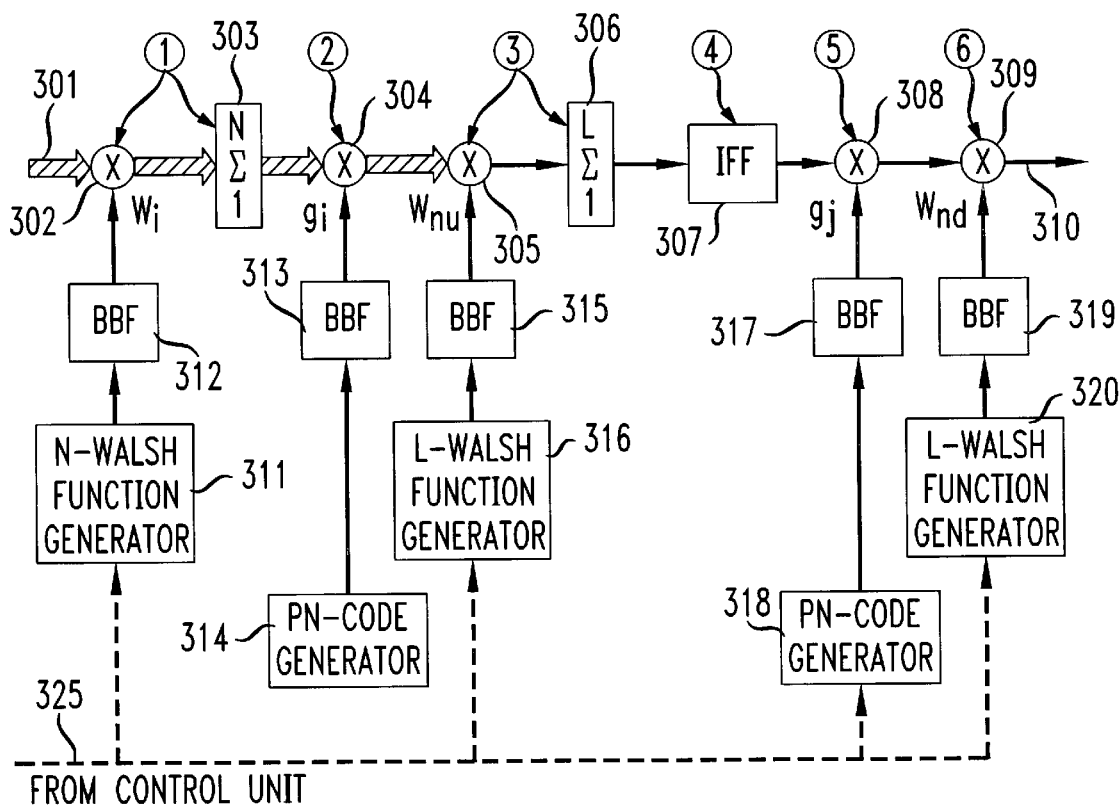

1. DEOVERSPREADING; BANDWIDTH NB -> B, WHERE B IS THE BEAM'S BANDWIDTH.
2. DESPREADING WITH THE $g_i$ PN SEQUENCES IDENTIFYING UPLINK BEAM i.
3. DESPREADING WITH THE WALSH CODE IDENTIFYING THE USER-n IN THE UPLINK($W_{nu}$)
4. IFF: INTERMEDIATE FREQUENCY FILTER
5. SPREADING WITH THE DOENLINKBEAM PN-CODE $g_j$
6. SPREADING WITH THE DOWNLINK USER WALSH CODE $W_{nd}$
- CODES $g_i, g_j, W_{nu}$, AND $W_{nd}$ HAVE THE SAME CHIP RATE AS THE BEAM BANDWIDTH REQUIRES
- WALSH CODES HAVE RATE N TIMES THE RATE OF $g_i$

FIG. 4

SATELLITE SWITCHED/CODE DIVISION MULTIPLE ACCESS (SS/CMDA)

THE TRAFFIC MATRIX, T $T = [t_{ij}]$ $t = \{u_1, u_2, ..., u_k, ...\} \quad k = 1, 2, ...$ $u_k = (g_i, g_j, W_{nu}, W_{nd})$ $t_{ij}$: REPRESENTS THE SET OF REQUESTS ($k = 1, 2, ...$) FROM UPLINK BEAM $i$ TO DOWNLINK BEAM $j$.

$g_i$ and $g_j$: REPRESENTS THE PN-CODES IDENTIFYING THE UPLINK AND DOWNLINK BEAMS, RESPECTIVELY.

$W_{nu}$ and $W_{nd}$: REPRESENT THE WALSH CODES IDENTIFYING THE TRAFFIC CHANNEL OR THE USER WITHIN THE WB-CDMA CHANNEL FOR THE UPLINK AND DOWNLINK, RESPECTIVELY

EXAMPLE:

DOWNLINK BEAM →

$$T = \begin{array}{c|ccc} & 1 & 2 & 3 \\ \hline 1 & u_2 & u_3 & u_1 \\ 2 & (u_4, u_5) & 0 & u_6 \\ 3 & 0 & u_7 & (u_8, u_9) \end{array} \begin{array}{l} \rightarrow u_2 + u_3 + u_1 \\ \rightarrow u_4 + u_5 + u_6 \\ \rightarrow u_7 + u_8 + u_9 \end{array} \text{(UPLINK ROW SUM)}$$

↑ UPLINK BEAM $u_2 + u_4 + u_5 \quad u_3 + u_7 \quad u_1 + u_6 + u_8 + u_9$ (DOWNLINK COLUMN SUM)

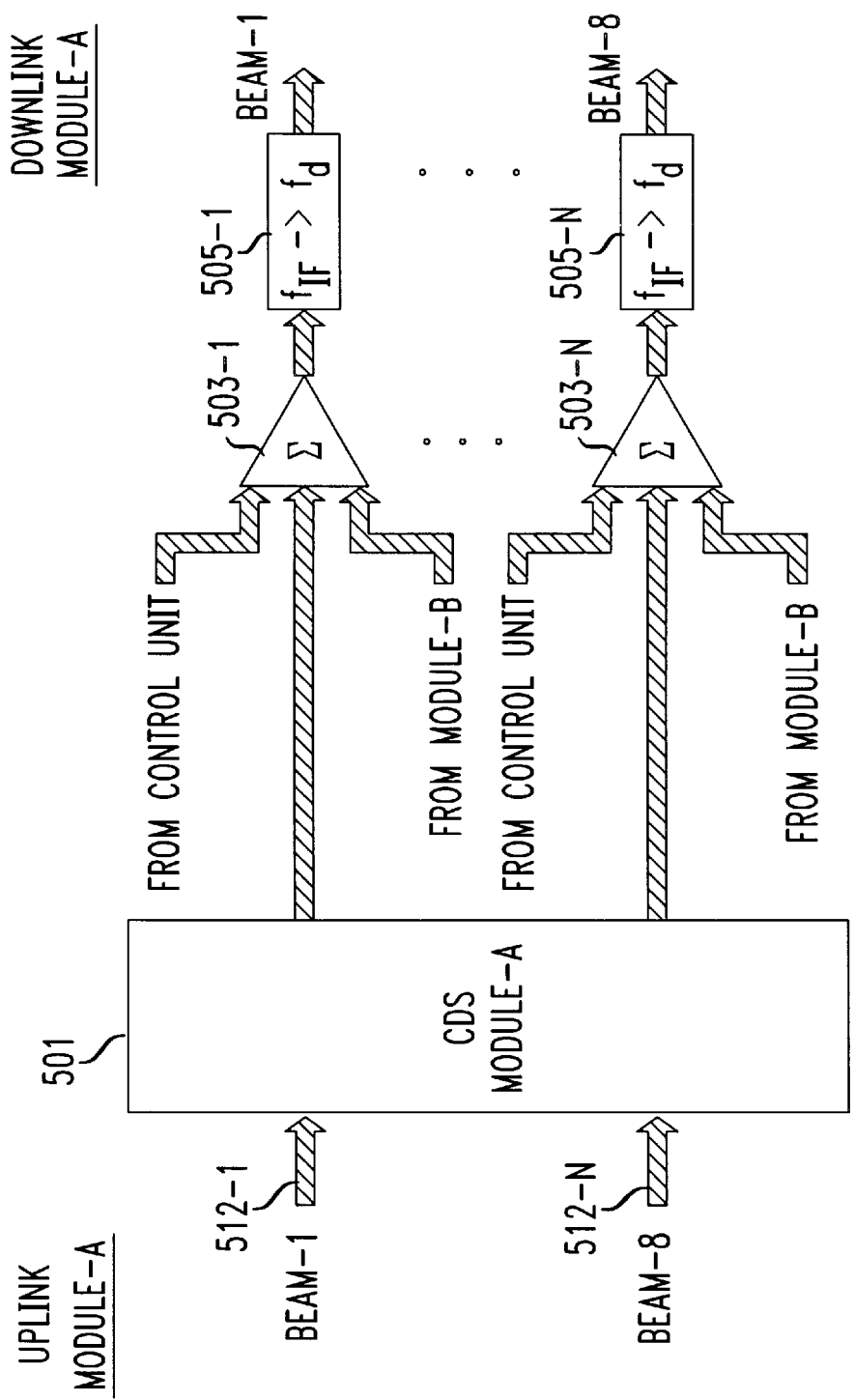
FIG. 5  SATELLITE SWITCHED/CODE DIVISION MULTIPLE ACCESS (SS/CDMA) DOWNLINK CODE DIVISION MULTIPLEXING

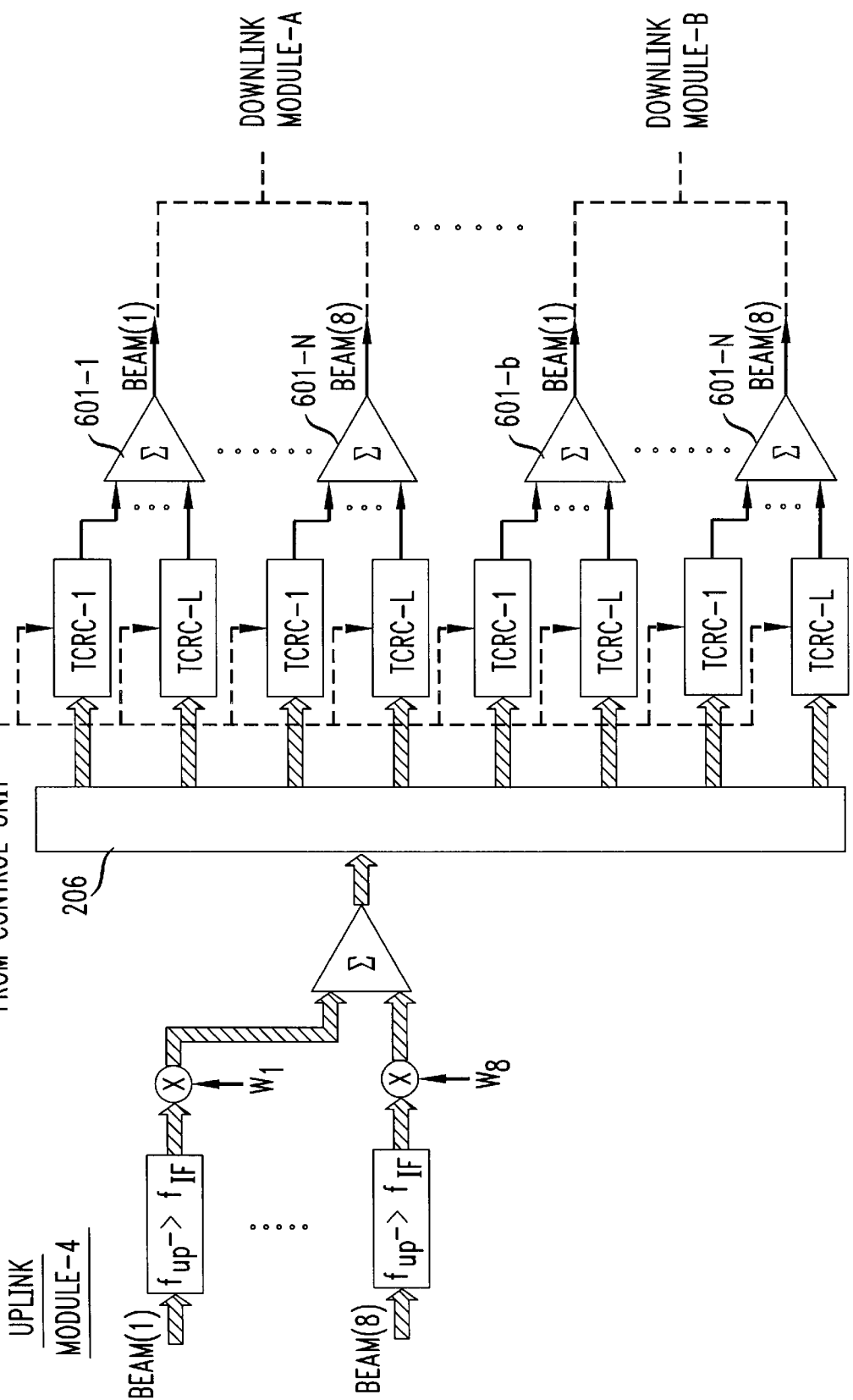
FIG. 6  SATELLITE SWITCHED/CODE DIVISION MULTIPLE ACCESS (SS/CDMA) CODE DIVISION SWITCH (CDS) WITH INTERMODULE ROUTING SATELLITE SWITCHED/CODE DIVISION MULTIPLE ACCESS (SS/CDMA)
DOWNLINK CODE DIVISION MULTIPLEXER (CDM)

METHOD AND APPARATUS FOR SWITCHING CODE DIVISION MULTIPLE ACCESS MODULATED BEAMS IN A SATELLITE

This application is a continuation-in-part of application Ser. No. 08/635,162, filed on Apr. 23, 1996, now abandoned.

FIELD OF THE INVENTION

This invention relates to switching apparatus and methods to be used in wired and/or wireless digital telecommunication systems for message switching. It is particularly concerned with the switching of spread spectrum/CDMA modulated beams carrying traffic channels from a specific source to a specific destination.

BACKGROUND OF THE INVENTION

Digital switching of CDMA digital telecommunication signals has previously been limited to circuit and packet switching. Packet type switching is batch transmission signaling and generally requires the use of a buffer memory somewhere in the transmission process. The switching (i.e., CDMA message multiplexing) of end-to-end CDMA complete message signals, without the buffering requirement, has been considered to have complexity sufficient to render it impractical and uneconomical. In some instances a CDMA beam may be redirected, but the individual traffic channels included within each uplink beam are left undisturbed in a corresponding downlink CDMA beam. Uplink CDMA beams are redirected and become a downlink beam, but include the same traffic channels. So traffic channels must have common destinations with the common redirected CDMA beam in which they are included.

In some instances the handling of CDMA packet beams requires the conversion of the CDMA traffic channels to baseband frequencies for switching and redirection processes to occur.

SUMMARY OF THE INVENTION

Therefore in accord with the invention a method and apparatus for switching traffic channels between uplink and downlink spread spectrum/CDMA modulated beams is disclosed as claimed in the claims. It particularly concerns CDMA information traffic channel (i.e.,message) switching in which a total aggregate information signal is switched at IF frequency without memory buffering required in the process.

In one general illustrative embodiment traffic channels in uplink CDMA beams, received by a switching medium/center, (e.g., a satellite switch) are identified by uplink spreading codes. These uplink CDMA beams are overspread and summed into a single stream from which a plurality of CDMA modulated downlink beams are created with each going to a specific destination. The traffic channels going to that specific destination are deoverspread and respread to form a CDMA downlink beam. The destination of each traffic channel, identified by unique user code, is joined into that CDMA modulated downlink beam having the same destination. User recovery is performed at an IF frequency. Application of the invention principles to various forms of spread spectrum is considered to be within the invention scope. In one embodiment multi-CDMA beams are switched in a satellite switching system.

In a particular illustrative embodiment each of a plurality or uplink CDMA modulated RF beams, each including a plurality of uplink traffic channels identified by orthogonal code are down converted to IF CDMA beams identified by PN codes and overspread with a new orthogonal code having a spreading rate N times that of the spreading code of the uplink CDMA modulated RF beam. In the illustrative embodiment "N" represents the number of uplink CDMA beams. All of the overspread uplink beams are combined into a single combined IF stream. The individual traffic channels are extracted from the combined IF stream by de-overspreading the stream with orthogonal codes and despreading with beam and traffic channel specific orthogonal codes. All traffic channels are respread with downlink beam codes and downlink orthogonal traffic channel codes and joined onto selected ones of downlink CDMA modulated IF beams having common destinations with the included traffic channels. Downlink CDMA modulated IF beams are up converted to RF frequency and transmitted to selected destinations.

The individual traffic channels are maintained distinct through the operation of overspreading, combined with user identifying orthogonal codes. These operations and apparatus, for switching traffic channels, may be combined in various combinations different from those disclosed herein without departing from the spirit and scope of the invention. All these variations will use the above principles of the invention.

In one embodiment control information is stored in a traffic matrix in memory storage contained in a switch control unit. Routing of traffic channels from uplink CDMA beams onto downlink CDMA beams is determined by the stored traffic matrix and the overhead signals activating the matrix.

An advantage of the invention is that switching (i.e., multiplexing of traffic channels among downlink beams) is performed independent of time as a controlling variable. No buffering (i.e., memory storage) of the traffic channels is required in the switching process.

BRIEF DESCRIPTION OF THE DRAWING

FIG. 2 is a block schematic of a code division switch;

FIG. 3 is a block schematic of a traffic channel recovery circuit which is a sub-component of the code division switch;

FIG. 4 is a schematic of the traffic matrix included in the control unit;

FIG. 5 is a block schematic of downlink code division multiplexing;

FIG. 6 is a block schematic of a code division switch with intermodule routing;

DETAILED DESCRIPTION

Figure 1:
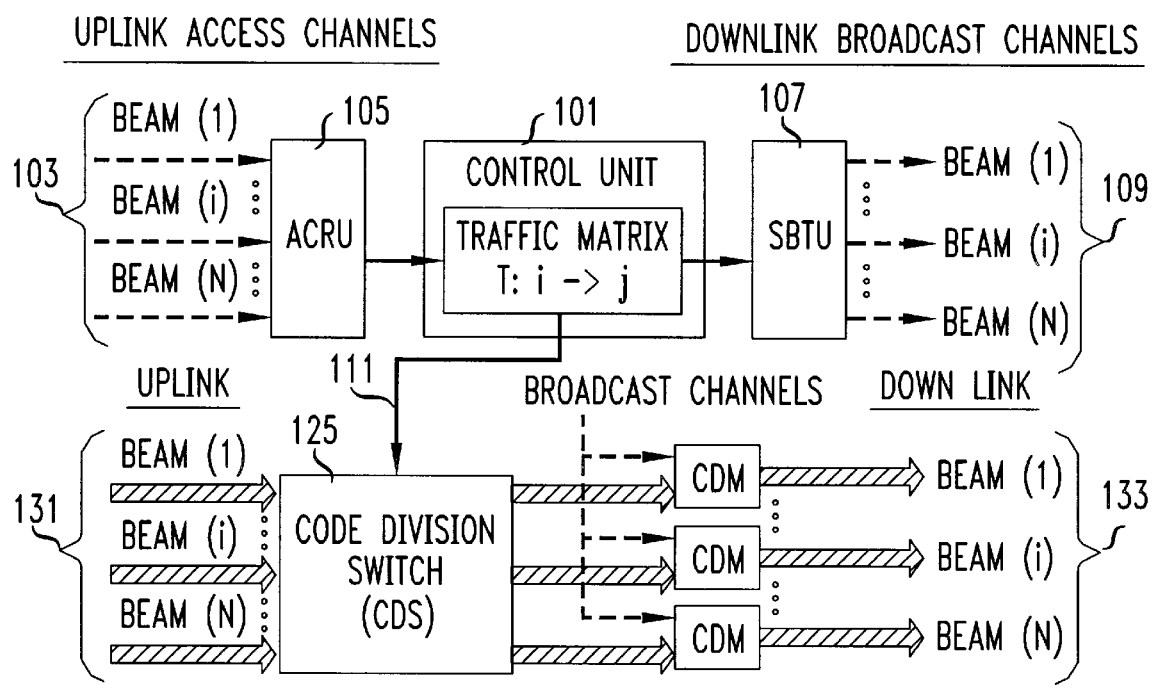
FIG. 1 is a block schematic of a code switching system architecture.

A code switching architecture, such as shown in FIG. 1, includes a control unit 101 having memory storage for a traffic matrix relating uplink sources to intended downlink destinations. Uplink access channels 103, which may comprise a plurality of uplink data and access CDMA beams 1 through N, are directed to an Access Channel Reception unit (ACRU) 105 for processing and for whose output is directed to the control unit 101. The output of the control unit 101 is applied to a Satellite Broadcast Transmitter Unit 107 where it supplies the downlink broadcast data and access channels over the CDMA beams 109. A second output of the control unit is applied, via lead 111, to a code division switch 125.

Code division switch 125 accepts a plurality of bearer CDMA modulated RF beams 131, downconverts the beams to IF and applies identifying and overspreading codes to the individual traffic channels contained within each beam.

The beams are all summed into one combined stream and the individual traffic channels are recovered and identified as to their destination in response to the control signal, applied via lead 111. The destination traffic channels are inserted into downlink CDMA beams 133 for transmission to specific downlink destinations.

While a satellite application, using an air interface is shown as an illustrative embodiment, the invention is not limited to satellite communication systems. The invention is equally applicable to terrestrial communication systems and to systems using wired and optical connections.

A code division switch, such as shown in FIG. 2 separates uplink traffic channels from uplink CDMA beams and inserts them in to downlink CDMA beams having the desired destination. Incoming uplink CDMA modulated RF beams 201-1 to 201-N, each of which include traffic channels, are each applied to downconversion frequency converters 202-1 to 202-N, respectively, to convert the beams into CDMA modulated IF beams. Each CDMA modulated beam is over-spread by the application of the Walsh function chips $W_1$ to $W_N$, as inputs 203-1 to 203-N, applied to the mixing circuits 204-1 to 204-N, respectively. The Walsh functions uniquely identify the traffic channels within the beams. Overspreading by a multiple of N does not contribute any interference to the various distinct traffic channels. All of the over-spread CDMA beams are summed into one inclusive signal stream by the summing circuitry 205. Summing of these IF beam signals combined with the overspreading avoids any inter-traffic-channel interference that would be inserted into the individual traffic channels and hence assure their subsequent intact recovery. In one illustrative embodiment of the invention this recovery is further enhanced by the use of orthogonal user spread coding.

This summed signal stream is applied to a distribution bus 206 which in turn applies the stream to a plurality of traffic channel recovery circuits 207-1 to 207-L. The output of each traffic channel recovery circuit is applied to a second summing circuit 208-1 to 208-N from which a downlink CDMA modulated if beam is derived with each downlink beam having a particular destination. The control unit described above applies control signals to each traffic channel recovery circuit 207-1 to 207-N to recover the traffic channels destined for a particular destination from the beam formed from the output of that traffic channel recovery circuit.

The beams are formed in the summing circuits 208-1 to 208-N and each beam is upconverted to RF by the upconversion frequency converters 209-1 to 209-N resulting in the downlink CDMA modulated RF beams 210-1 to 210-N.

In the illustrative traffic channel recovery circuit of FIG. 3 individual traffic channels are recovered from the summed beam and segregated into downlink beams having a destination in common with the destination of the traffic channel. Recovery of the traffic channels is accomplished by the despreading of the applied summed signal stream with beam and user codes and filtering the desired IF frequency.

The individual traffic channels are recovered from the summed beam in the traffic channel recovery circuits which supply a downlink with traffic channels having a common destination/ A particular embodiment of the Traffic channel recovery circuit, shown in FIG. 3, receives the summed signal at input 301 and applies it to a mixer 302 which deoverspread the summed signal stream with a first user code supplied by a N-Walsh function generator 311 fed through a base band filter 312. The various traffic channels are recovered by the integrator 303 and are applied to the mixer 304 for despreading with codes supplied by a beam PN code generated by the PN code generator 314 and filtered by the base band filter 313. The signal is further despread by a code supplied by the L-Walsh function generator 316 and filtered by baseband filter 315, which code is applied to mixer 305 for despreading. This despread signal is integrated by integrator 307 and applied to mixer 308. It is spread by a PN code supplied by PN code generator 318 and filtered by baseband filter 317 This signal is further spread in mixer 309 by a L-Walsh code supplied by a Walsh function generator 320 and filtered by the baseband filter 319. The beam output containing the baseband IF downlink beam is supplied on output lead 310.

An illustrative matrix (for three beams) which may be used in the control unit for directing uplink traffic channels to downlink beams is shown in the FIG. 4 and may be contained in the control unit as part of a stored program. As shown the columns are identified with the downlink CDMA beams and the rows are identified with the uplink CDMA beams. Each uplink and downlink CDMA contains a plurality of user traffic channels Un+Um+ - - - +Up and Ua+Ub + - - - Uc, respectively. The matrix entries indicate the codes to be used for the uplink and downlink traffic channels. This assures that the downlink traffic channels are included in the desired downlink beam.

A scheme for multiplexing downlink beams is schematically shown in the FIG. 5. A code division switch (module A of a plurality of modules) 501 receives the CDMA beams 502-1 through 502-N. The output beams of module A and the other modules (not shown) are applied to a plurality of summers 503-1 through 503-N. The output of the summers 503-1 through 503-N are controlled by the control unit input 504-1 through 504-N which selects the traffic channels to be applied to the up conversion circuits 505-1 through 505-N, which includes the traffic channels in the appropriate downlink RF beams.

A specific system for intermodule routing is shown in the FIG. 6 in which the bus is supplied by the input circuitry shown in the FIG. 2. The output scheme includes an identical plurality of traffic channel recovery units "one" through "L" all connected to different summing circuits 601-1 through 601-N for forming downlink beams each directed to a different downlink module for further transmission.

Figure 7:
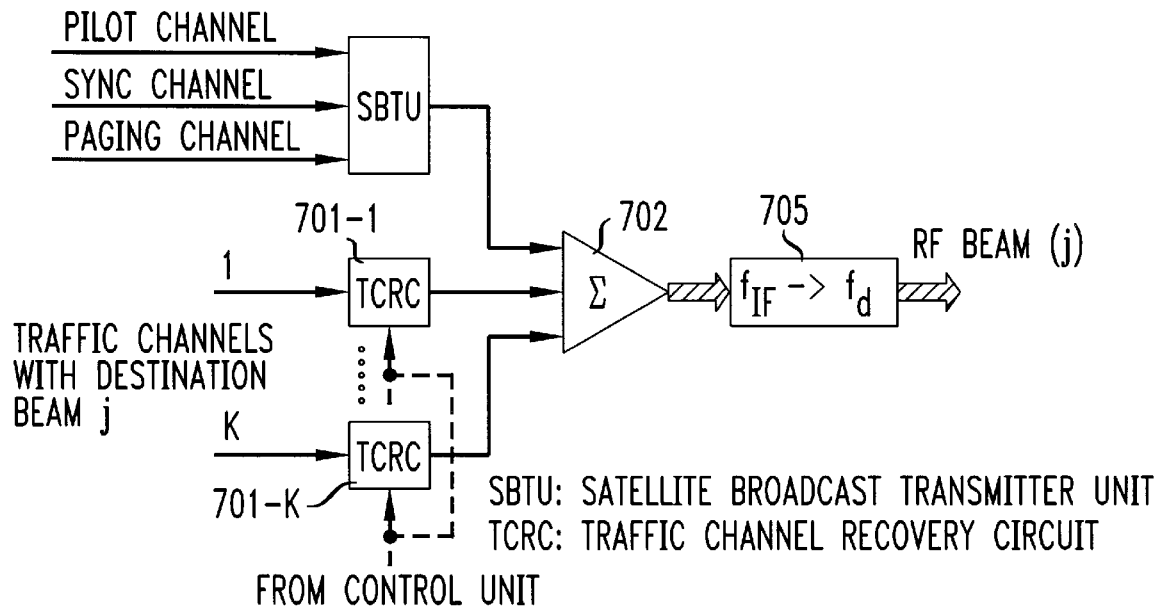
FIG. 7 is block schematic of a downlink code division multiplexer.

The arrangement for forming a beam with the traffic channels all having a destination in common with a particular beam "j" is shown in the FIG. 7 The traffic channels selected by traffic channel recovery circuits 701-1 through 701-N are applied to a summer 702 in common with the pilot , sync and paging channels 703. The summer output is applied to an upconversion frequency converter 705 to generate the desired downlink CDMA modulated RF beam.

Figure 8:
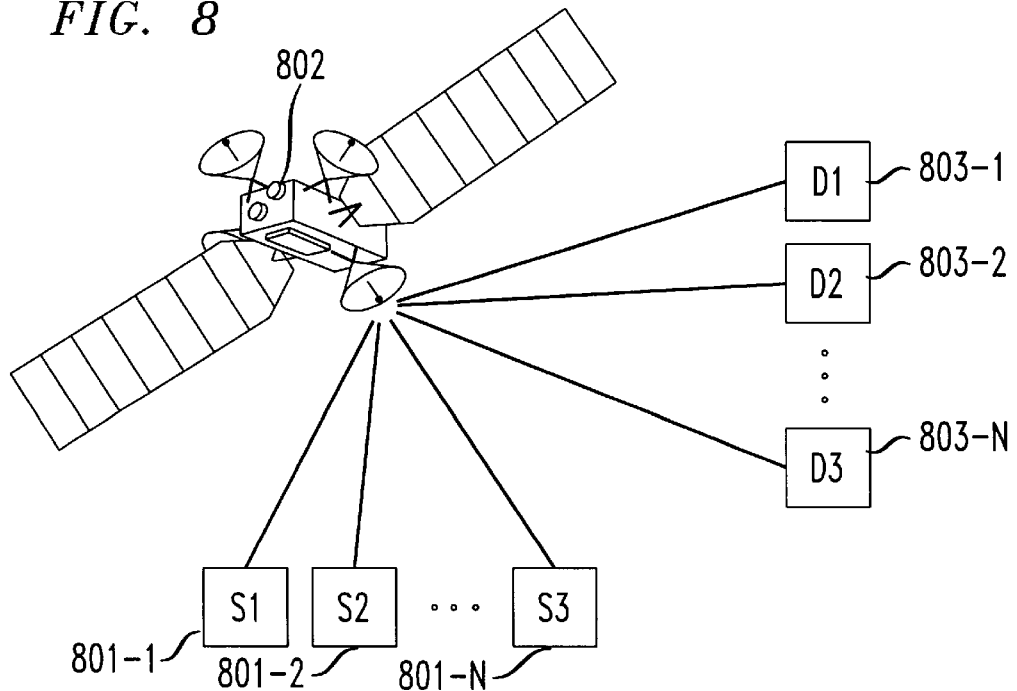
FIG. 8 is a system schematic showing one application of the code division switch.

A typical illustrative application of the code division switch is illustrated in the FIG.8, in which multiple source points 801-1 to 801-N are connected by a CDMA switching satellite 802 to any one of the multiple destination points 803-1 to 803-N. This multi-point to multi-point switched connection has not been priorly achieved in the transmission of message CDMA signals/beams. the air interfaces further allow unlimited bandwidth in the uplink and downlink signals.

System operation is greatly enhanced in preventing interchannel interference if the code arrival times at the switch (e.g., satellite) of the varying beams and channels are system wide synchronized. Synchronization may be readily achieved by determining a time interval of transmission from a source of the traffic channel to the switching mechanism (e.g., satellite switch) and using this time interval to adjust timing of signal transmission at the source to have transmitted code arrive in synchronism with code reception of other code transmissions in the system.

While the invention has been described in terms of specific illustrative embodiments it is understood that the invention may be incorporated in differing embodiments. For example switching may occur at baseband frequencies rather than at IF frequencies, if desired, without departing from the spirit and scope of the invention. Terrestrial switching may be used instead of satellite switching, for example, is not desired. Many variations wll suggest themselves to those skilled in the art within the scope of the invention.

The invention claimed is:

1. In a satellite communication system a method for switching traffic channels on board a satellite between a plurality of uplink and downlink CDMA modulated RF beams of a common RF channel, each traffic channel being uniquely identified by an orthogonal code and a beam code;
   downconverting on board the satellite the uplink CDMA modulated RF beams into uplink CDMA modulated beams;
   overspreading on board the satellite each CDMA modulated beam with a new orthogonal code having a rate N times higher than a spreading rate of the uplink CDMA modulated RF beams;
   summing on board the satellite all of the plurality of uplink CDMA modulated beams into a single combined stream;
   extracting on board the satellite the individual traffic channels, according to their destinations, from the single combined stream; by:
      de-overspreading on board the satellite the single combined stream with an orthogonal code, despreading with the beam code, and despreading with the orthogonal code to recover the individual traffic channels;
      respreading on board the satellite with a downlink beam code and with a downlink orthogonal traffic channel code;
      combining on board the satellite all CDMA traffic channels into a plurality of downlink CDMA modulated beams with a commonality of destination between the CDMA modulated beams and the traffic channels they include;
      upconverting on board the satellite each one of the plurality of downlink beams into a downlink CDMA modulated RF beam carrying selected traffic channels to their intended destination in common with a destination of the downlink CDMA modulated RF beam.

2. In a satellite communication system a method for switching traffic channels on board a satellite between a plurality of unlink and downlink CDMA modulated RF beams of a common RF channel, as claimed in claim 1:
   further including the step of:
      generating codes on board the satellite for the purpose of extracting the individual traffic channels according to a destination control signal.

3. In a satellite communication system a method for switching traffic channels on board a satellite between a plurality of uplink and downlink CDMA modulated RF beams of a common RF channel, as claimed in claim 1:
   wherein the step of overspreading includes:
      using Walsh with N chips times spreading PN codes on board the satellite to overspread the CDMA modulated beam.

4. In a satellite communication system a method for switching traffic channels on board a satellite between a plurality of uplink and downlink CDMA modulated RF beams of a common RF channel, as claimed in claim 1:
   further including the step of:
      storing destination control signals on board the satellite in a matrix array used for generating the destination control signals in response to matrix entries $T_{ij}$ of sums of uplink i and downlink j CDMA modulated beams.

5. A CDMA switch included within a satellite for switching traffic channels between a plurality of uplink and downlink CDMA modulated RF beams of a common RF channel, where each traffic channel is uniquely identified by an orthogonal code and a beam code;
   first frequency conversion means within the satellite for receiving uplink CDMA modulated RF beams and downconverting the uplink CDMA modulated RF beams;
   overspreading means within the satellite connected to an output of the first frequency conversion means and overspread each CDMA modulated IF beam and receive as spreading input a new orthogonal code having a rate N times higher than a spreading rate of the uplink CDMA modulated RF beams;
   summing means within the satellite connected to receive all overspread CDMA modulated IF beams and sum all of the overspread uplink CDMA modulated IF beams into a single combined IF stream;
   traffic channel recovery means within the satellite for receiving the single combined IF stream and extracting the individual traffic channels, according to their destinations from the single combined RF stream; including:
      de-overspreading means connected to receive the single combined IF and de-overspread the single combined IF stream with an orthogonal code,
      despreading means connected for despreading an output of the de-overspreading means within a beam code, and further despread it with an orthogonal code to recover the individual traffic channels, and a filter to filter it at the IF frequency;
      respreading means within the satellite connected for respreading an output of the filter with a downlink beam code and with a downlink orthogonal traffic channel code;
      signal combining means within the satellite connected for combining all CDMA IF traffic channels into a plurality of downlink CDMA modulated IF beams with a commonality of destination between the CDMA modulated beams and the traffic channels they include;
      second frequency conversion means within the satellite connected for upconverting each one of the plurality of downlink beams into a downlink CDMA modulated RF beam carrying selected traffic to their intended destination in common with a destination in common with a destination of the downlink CDMA modulated RF beam.

6. A code division switch included within a satellite for switching traffic channels between a plurality of uplink and downlink CDMA modulated RF beams of a common RF channel, as claimed in claim 5:

further including:
a code generator within the satellite connected to the traffic channel recovery means and generating codes for the purpose of extracting the individual traffic channels according to destination in response to a destination control signal.

7. A code division switch included within a satellite for switching traffic channels between a plurality of uplink and downlink CDMA modulated RF beams of a common RF channel, as claimed in claim 5:

further including:
a Walsh function generator within the satellite for generating and connected for applying an N chip Walsh function to overspread the uplink CDMA modulated IF beam.

8. A code division switch included within a satellite for switching traffic channels between a plurality of uplink and downlink CDMA modulated RF beams of a common RF channel, as claimed in claim 5:

further including:
a memory within the satellite for storing destination control signals in a matrix array used for generating the destination control signals in response to column and row sums of uplink and downlink CDMA modulated beams.

* * * * *